(12) United States Patent
Brindle

(10) Patent No.: US 7,114,124 B2
(45) Date of Patent: Sep. 26, 2006

(54) METHOD AND SYSTEM FOR INFORMATION RETRIEVAL FROM QUERY EVALUATIONS OF VERY LARGE FULL-TEXT DATABASES

(75) Inventor: Edward E. Brindle, Victor, NY (US)

(73) Assignee: Xerox Corporation, Stamford, CT (US)

( * ) Notice: Subject to any disclaimer, the term of this patent is extended or adjusted under 35 U.S.C. 154(b) by 492 days.

(21) Appl. No.: 09/793,235

(22) Filed: Feb. 26, 2001

(65) Prior Publication Data

US 2001/0047374 A1    Nov. 29, 2001

Related U.S. Application Data

(60) Provisional application No. 60/185,312, filed on Feb. 28, 2000.

(51) Int. Cl.
*G06F 15/00* (2006.01)

(52) U.S. Cl. .................. 715/530; 715/501.1

(58) Field of Classification Search ............ 715/501.1, 715/517, 500, 530; 707/3–4
See application file for complete search history.

(56) References Cited

U.S. PATENT DOCUMENTS

| | | | | |
|---|---|---|---|---|
| 5,214,755 A * | 5/1993 | Mason | ........................ | 715/520 |
| 5,504,891 A * | 4/1996 | Motoyama et al. | ......... | 715/513 |
| 5,659,732 A | 8/1997 | Kirsch | | |
| 5,822,509 A * | 10/1998 | Morita et al. | ............... | 358/1.16 |
| 5,826,031 A * | 10/1998 | Nielsen | ........................ | 709/233 |
| 5,848,413 A * | 12/1998 | Wolff | .......................... | 707/10 |
| 5,867,164 A * | 2/1999 | Bornstein et al. | ........... | 715/530 |
| 5,913,215 A | 6/1999 | Rubinstein et al. | | |
| 5,918,240 A | 6/1999 | Kupiec et al. | | |
| 5,963,205 A * | 10/1999 | Sotomayor | .................. | 715/531 |
| 6,012,053 A | 1/2000 | Pant et al. | | |
| 6,020,970 A * | 2/2000 | Erickson et al. | ............. | 358/1.1 |
| 6,029,180 A * | 2/2000 | Murata et al. | ........... | 715/501.1 |
| 6,065,012 A * | 5/2000 | Balsara et al. | .............. | 707/102 |
| 6,088,480 A * | 7/2000 | Sakamoto | .................... | 382/180 |
| 6,182,085 B1 * | 1/2001 | Eichstaedt et al. | ....... | 707/104.1 |
| 6,271,840 B1 * | 8/2001 | Finseth et al. | .............. | 715/513 |
| 6,301,586 B1 * | 10/2001 | Yang et al. | ............... | 707/104.1 |
| 6,366,933 B1 * | 4/2002 | Ball et al. | .................... | 715/511 |
| 6,397,218 B1 * | 5/2002 | Stern et al. | ................... | 707/10 |
| 6,405,175 B1 * | 6/2002 | Ng | .............................. | 705/14 |

(Continued)

FOREIGN PATENT DOCUMENTS

EP    0 933 712 A    8/1999

(Continued)

OTHER PUBLICATIONS

Wynblatt et al., Web page caricatures : multimedia summaries for WWW documents, IEEE Jul. 1998, pp. 194-199.*

(Continued)

*Primary Examiner*—Cong-Lac Huynh
(74) *Attorney, Agent, or Firm*—Nixon Peabody LLP

(57) ABSTRACT

The present invention generally relates to the field of electronic document storage and management, and more particularly to systems and methods for computer based text or information from text databases. More specially, the present invention relates to taking a set of URLs provided by an Internet search engine/agent, and presenting summaries of the web sites associated with the URLs in an easily readable and understandable format.

24 Claims, 4 Drawing Sheets

U.S. PATENT DOCUMENTS

| | | | |
|---|---|---|---|
| 6,415,319 B1 * | 7/2002 | Ambroziak | 709/219 |
| 6,480,837 B1 * | 11/2002 | Dutta | 707/3 |
| 6,487,555 B1 * | 11/2002 | Bharat et al. | 707/10 |
| 6,522,770 B1 * | 2/2003 | Seder et al. | 382/100 |
| 6,591,289 B1 * | 7/2003 | Britton | 709/203 |
| 6,611,835 B1 * | 8/2003 | Huang et al. | 707/10 |
| 6,625,594 B1 * | 9/2003 | Rolland et al. | 707/3 |
| 6,643,641 B1 * | 11/2003 | Snyder | 707/4 |
| 6,650,998 B1 * | 11/2003 | Rutledge et al. | 701/211 |
| 6,675,350 B1 * | 1/2004 | Abrams et al. | 715/501.1 |
| 6,775,026 B1 * | 8/2004 | Kato | 358/1.15 |
| 6,807,571 B1 * | 10/2004 | Hatano et al. | 709/219 |
| 6,938,083 B1 * | 8/2005 | Teague | 709/225 |
| 2002/0087326 A1 * | 7/2002 | Lee et al. | 704/270.1 |
| 2002/0152236 A1 * | 10/2002 | Incertis-Carro | 707/501.1 |
| 2003/0229854 A1 * | 12/2003 | Lemay | 715/513 |
| 2005/0010860 A1 * | 1/2005 | Weiss et al. | 715/500.1 |

FOREIGN PATENT DOCUMENTS

| | | |
|---|---|---|
| EP | 0 964 341 A | 12/1999 |
| WO | WO 98 26357 A | 6/1998 |

OTHER PUBLICATIONS

Kao et al., Recommending anchor points in structure-preserving hypertext document retrieval, IEEE Aug. 1998, pp. 582-587.*

Kao et al., Anchor point indexing in Web document retrieval, IEEE Aug. 2000, pp. 364-373.*

Amitay et al., Automatically Summarising Web Sites —Is There A Way Around It?, ACM 2000, pp. 173-179.*

Kolcz et al., An Internet-based Newspaper Filtering and Personalization System, ACM 1999, p. 332.*

Weinberger, D., "How Microsoft Could Kill Document Management," *Internet Design Magazine*, http://idm.internet.com/text/articles/200002/ia_02_4_00a.html retrieved on Feb. 21, 2001, 2 pages.

S. Gauch et al., "Information Fusion With ProFusion," *Proceedings of Webnet 96*, World Conference of the Web Society, San Francisco, California, pp. 15-19 (1996).

"Adobe Acrobat 4.0 Software Bridges the Gaps in Today's Office Document Workflows," (Feb. 16, 1999) at http://www.adobe.co.uk/aboutadobe/pressroom/pressmaterials/pdfs/acrobat/Acro4pr.pdf (retrieved on Jan. 19, 2006).

* cited by examiner

METHOD AND SYSTEM FOR INFORMATION RETRIEVAL FROM QUERY EVALUATIONS OF VERY LARGE FULL-TEXT DATABASES

This application claims the benefit of U.S. Provisional Patent Application Ser. No. 60/185,312 filed on Feb. 28, 2000, which is herein incorporated by reference.

FIELD OF THE INVENTION

The present invention generally relates to the field of electronic document storage and management and, more particularly, to systems and methods for computer based text or information from text databases. More specifically, the present invention relates to taking a set of URLs provided by an Internet search engine/agent, and presenting summaries of the web sites associated with the URLs in an easily readable format.

BACKGROUND OF THE INVENTION

Information has recently undergone a transition from a scarce commodity to an overabundant commodity. With a scarce commodity, efforts are centered on acquiring the commodity, whereas with an overabundant commodity, efforts are centered on filtering the commodity to make it more valuable. The prime example of this phenomenon is the explosion of information resulting from the growth of the global Internetwork of networks known as the "Internet." Networks and computers connected to the Internet pass data using TCP/IP (Transport Control Protocol/Internet Protocol) for reliably passing data packets from a source node to a destination node. A variety of higher level protocols are used on top of TCP/IP to transport objects of digital data, the particular protocol depending on the nature of the objects. For example, e-mail is transported using Simple Mail Transport Protocol (SMTP), while files are transported using the File Transfer Protocol (FTP).

Hypertext documents and their associated effects are transported using the Hypertext Transport Protocol (HTTP). When many hypertext documents are linked to other hypertext documents, they collectively form a "web" structure, which led to the same "World Wide Web" (often shortened to "WWW" or "the Web") for the collection of hypertext documents that can be transported using HTTP. Of course, hyperlinks are not required in a document for it to be transported using HTTP. In fact, any object can be transported using HTTP, so long as it conforms to the requirements of HTTP.

In a typical use of HTTP, a browser sends a uniform resource locator (URL) to a Web server and the Web server returns a Hypertext Markup Language (HTML) document for the browser to display. The browser is one example of an HTTP client and is so named because it displays the returned hypertext and allows the user an opportunity to select and display other hypertext documents referenced in the returned document. The Web server is an Internet node which returns hypertext documents requested by HTTP clients.

Some Web servers, in addition to serving static documents, can return dynamic documents. A static document is a document which exists on a Web server before a request for the document is made and for which the Web server merely sends out the static document upon request. A static page URL is typically in the form of "host.subdomain.domain.TLD/path/file" or the like. That static page URL refers to a document named "file" which is found on the path on the machine which has the domain name host.subdomain.domain.TLD. An actual domain such as "www." followed by "Xerox" followed by ".com" refers to the machine (or machines) designated "www" at the domain "xerox" in the ".com" top-level domain (TLD). By contrast, a dynamic document is a document which is generated by the Web server when it receives a particular URL which the server identifies as a request for a dynamic document.

Many Web servers operate "Web sites" which offer a collection of linked hypertext documents controlled by a single person or entity. Since the Web site is controlled by a single person or entity, the hypertext documents, often called "Web pages" in this context, have a consistent look and subject matter. Especially in the case of Web sites put up by commercial interests selling goods and services, the hyperlinked documents which form a Web site will have few, if any, links to pages not controlled by the interest. The terms "Web site" and "Web page" are often used interchangeably, but herein a "Web page" refers to a single hypertext document which forms part of a Web site and "Web site" refers to a collection of one or more Web pages which are controlled (i.e., modifiable) by a single entity or group of entities working in concert to present a site on a particular topic.

With all the many sites and pages that the many millions of Internet users might make available through their Web servers, it is often difficult to find a particular page or determine where to find information on a particular topic. There is no "official" listing of what is available, because anyone can place anything on their Web server and need not report it to an official agency and the Web changes so quickly. In the absence of an official "table of contents", several approaches to indexing the Web have been proposed.

One approach is to index all of the Web documents found everywhere. While this approach is useful to find a document on a rarely discussed topic or a reference to a person with an uncommon first or last name, it often leads to excessive numbers of "hits." Another approach is to categorize web documents and make them searchable by category.

Although the use of the Internet search engines/agents to gather information from the Internet reduces the voluminous amount of information on the Internet, the search engines still return a very large number of Internet sites (URLs), which the person searching must tediously "visit" to extract applicable information and then make a determination to do more searching. Often the person finds an "alternate link" which may be interesting yet not in the search criteria, and the person spends time visiting other sites which are not directly applicable. This results in wasted time, and longer overall information collection times. Therefore, there is a need to decrease the overall information collection time by extending the use of Internet search engines by providing an alternate methodology for information extraction.

SUMMARY OF THE INVENTION

An apparatus for generating and presenting information from a collection of uniform resource locators provided by an Internet search engine, comprising: means for extracting uniform research locators provided by the Internet search engine; means for fetching uniform research locators, wherein each uniform research locator has an associated HTML item; means for summarizing the HTML items into summaries; means for storing individual summaries s in a repository; and means for presenting the desired summaries in one document.

A method for generating and presenting information from a collection of uniform resource locators provided by an Internet search engine, comprising: extracting uniform research locators provided by the Internet search engine; fetching uniform research locators, wherein each uniform research locator has an associated HTML item; summarizing the HTML items into summaries; storing individual summaries in a repository; and means for presenting the summaries in one document.

A method for summarizing and presenting information from contents of an Internet search in accordance with another embodiment includes a few steps. One or more uniform research locators are extracted from the contents of the Internet search. Each of the extracted uniform research locators is fetched. One or more HTML items associated with each of the fetched uniform resource locator are accessed. A summary of the accessed HTML items for each of the uniform research locators is generated. A layout of at least two or more of the summaries is generated and then the layout of the summaries for the contents of the Internet search is provided.

A system for summarizing and presenting information from contents of an Internet search in accordance with another embodiment includes an extraction processing system, a fetching processing system, an access processing system, a summary processing system, a layout processing system, and a presentation processing system. The extraction processing system extracts one or more uniform research locators from the contents of the Internet search. The fetching processing system fetches each of the extracted uniform research locators to access one or more HTML items associated with each of the fetched uniform resource locator. The summary processing system generates a summary of the accessed HTML items for each of the uniform research locators. The layout processing system that generates a layout of two or more of the summaries. The presentation processing system provides the layout of the summaries of the contents of the Internet search.

A computer readable medium having stored thereon instructions for summarizing and presenting information from contents of an Internet search in accordance with another embodiment of the present invention includes instructions which when executed by a processor, cause the processor steps as described below. First, one or more uniform research locators are extracted from the contents of the Internet search. Each of the extracted uniform research locators is then fetched to access one or more HTML items associated with each of the fetched uniform resource locator. A summary of the accessed HTML items for each of the uniform research locators is generated, as well as a layout of at least two or more of the summaries. When the layout is completed, the layout of the summaries for the contents of the Internet search is provided to an operator.

DETAILED DESCRIPTION

The present invention generally relates to taking information or contents returned to the user from a search by an Internet search agent/engine (which is often in the form of URLs), and sending it to a server or other suitable computing device by way of common network print interfaces (e.g., TCP/IP lpr or ftp, Novell Nprint, Apple PAP) as it would to any common computer or printer. The server then extracts each URL from the information and fetches each URL to access the HTML items at each fetched URL. The fetched contents or information for the URL (HTML—hypertext markup language) are saved and sent to a software agent which summarizes or reduces the contents into a more manageable form. The summaries are then sent to another software agent, which then creates an output that can be printed or returned to the user electronically or printed on paper, so that the user can quickly determine which URLs may require further inspection.

Figure 1:
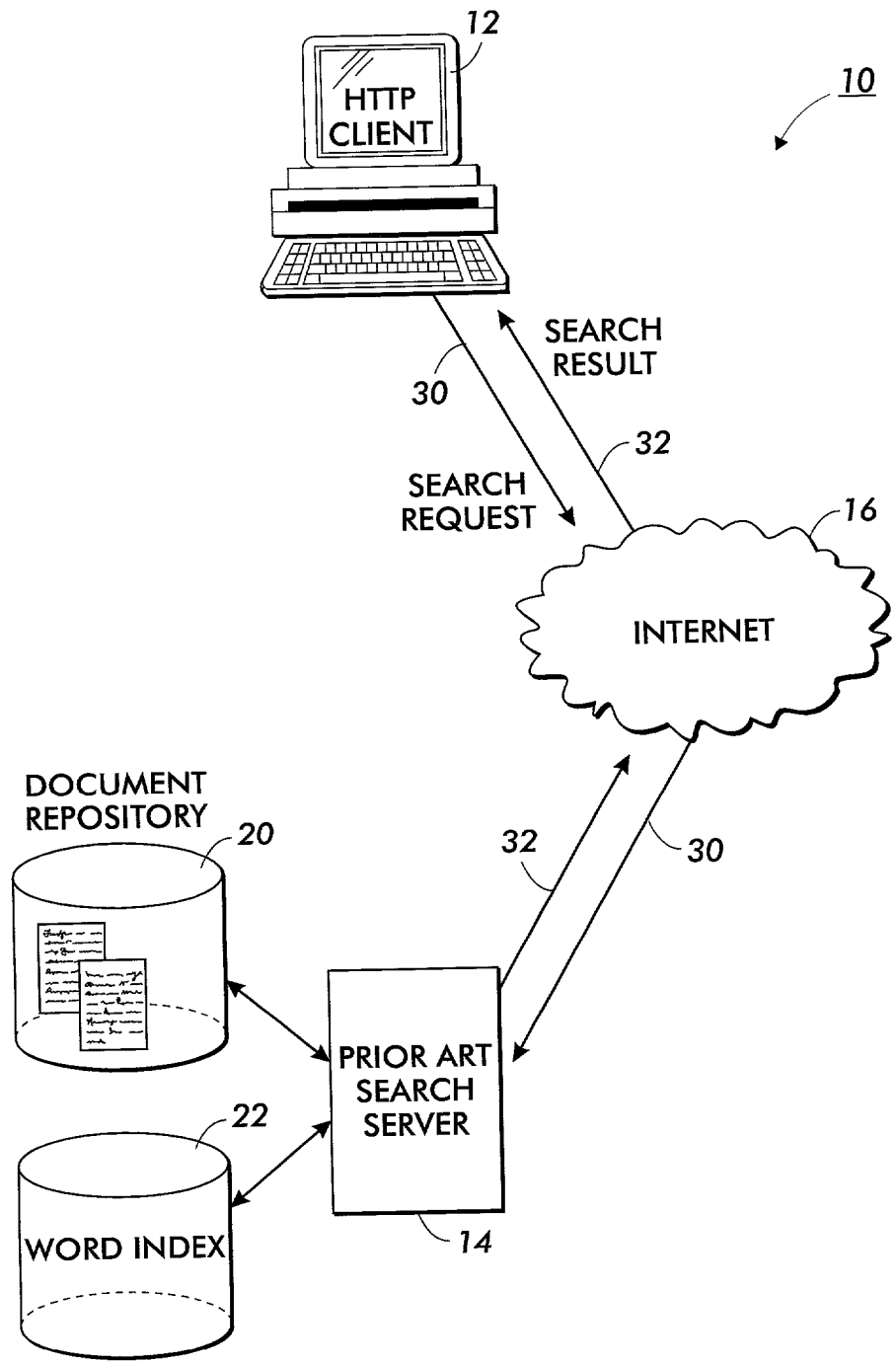
FIG. 1 is a schematic diagram of a client-server system having a prior art search engine.

Referring to FIG. 1, a schematic diagram of a client-server system 10 having a prior art search engine 14, such as the search engine disclosed in U.S. Pat. No. 5,991,756 and which is herein incorporated by reference, is illustrated. System 10 is shown comprising an HTTP client 12 connected to a search server 14 via Internet 16. Search server 14 is coupled to a document repository 20 and a word index 22 and responds to a search request 30 with a search result 32.

In operation, a user at a browser or other HTTP client system 12, sends a request 30 containing a search expression to search server 14. The search server 14 parses the search expression and, if the search expression is in a valid format, uses the search expression to find documents in document repository 20 that match the search expression. Search server 14 responds with either a list of matching documents or the documents themselves. Word index 22 is used to speed up the search for documents in document repository 20.

Figure 2:
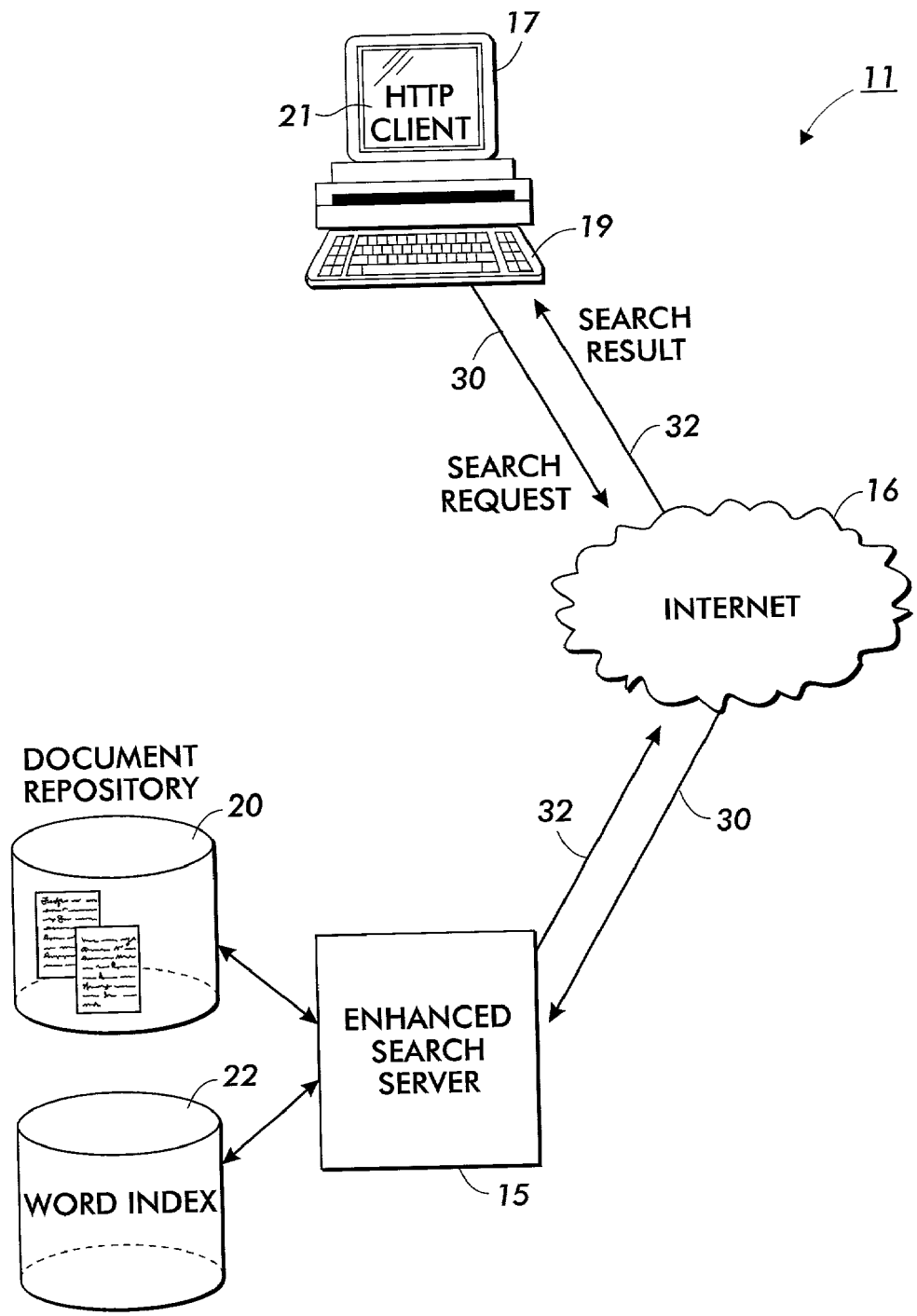
FIG. 2 is a schematic diagram of a client-server system having an enhanced search engine in accordance with an embodiment of the present invention.

Referring to FIG. 2, a schematic diagram of a client-server system 11 having an enhanced search engine 15 in accordance with one embodiment is illustrated. This embodiment of the system 11 comprises an HTTP client processing system 17 operatively coupled to a search server 15 via the Internet 16. The search server 15 in this embodiment is also operatively coupled to a document repository 20 and a word index 22 and responds to a search request 30 with a search result 32. Although in this particular embodiment communication between the client processing system 17, the search server 15, and/or other elements in the system 11 is accomplished via the Internet, other communication systems and/or methods can be used, including a direct connection between elements, a local area network, a wide area network, modems and phone lines, and/or wireless communication technology, each having their own respective communications protocols. Additionally, although one configuration for the client-server system 11 is shown, other configurations are possible and envisioned.

In this particular embodiment, the search server 15 includes at least one processor, at least one memory storage device, and at least one input/output user interface coupled together by a bus system or other link, although the search server 15 may comprise other components, other numbers of the components, and other combinations of the components. The processor in search server 15 executes a program of stored instructions for summarizing and presenting information from contents of an Internet search in accordance with one embodiment of the present invention as described herein and set forth in FIG. 3. A variety of different types of memory storage devices, such as a random access memory (RAM) or a read only memory (ROM) in the server 15 or a floppy disk, hard disk, CD ROM, or other computer readable medium which can be read from and/or written to by a magnetic, optical, or other reading and/or writing system that is coupled to the processor in server 15, can be used to store the programmed instructions described herein as well as other information. The input/output user interface is used to operatively couple and communicate between the search server 15 and the client processing system 17, the document repository 20, and the word index 22. Although in this particular embodiment, the method is stored as programmed instructions in the memory storage device in the search server 15 for execution by the processor in the search server 15, some or all of the programmed instructions could be stored and/or executed elsewhere. By way of example only, at least a portion of the programmable instructions for the method in accordance with the present invention could be stored in a memory device and executed by a processor in another server operatively coupled to search server 15 or could be stored in a memory device and executed by a processor in the client processing system 17.

The client processing system 17 includes at least one processor, at least one memory storage device, at least one input/output user interface, at least one display device 21, and at least one user input device 19 which are coupled together by a bus system or other link, although the client processing system 17 can comprise other components, other numbers of the components, and other combinations of the components. Again a variety of different types of memory storage devices, such as a random access memory (RAM) or a read only memory (ROM) in the system 17 or a floppy disk, hard disk, CD ROM, or other computer readable medium which can be read from and/or written to by a magnetic, optical, or other reading and/or writing system that is coupled to the processor in system 17, can be used to store the programmed instructions described herein as well as other information. The input/output user interface is used to operatively couple and communicate between the client processing system 17 and the search server 15. The display device 21 displays information for the operator, such as the layout of the summaries of the contents of the Internet search from a received electronic document. A variety of different types of display devices can be used, such as a monitor, printer, or any other type of device which can convey information to the user of the client processing system 17. The user input device 19 enables an operator to generate and transmit signals or commands to the search server 15, such as the search request 30. A variety of different types of user input devices can be used, such as a keyboard, computer mouse, or any other user input device which provides a mechanism for a user or operator.

Figure 3:
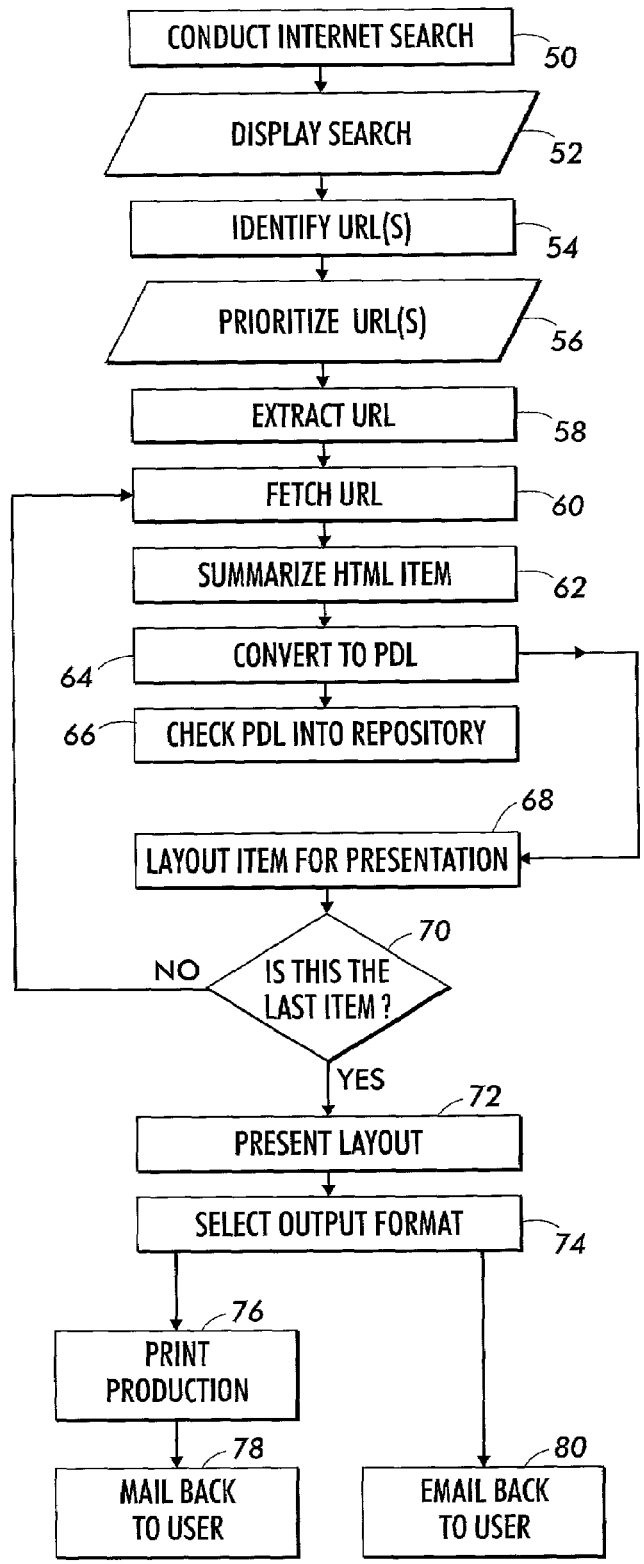
FIG. 3 is a flow chart showing another embodiment of the present invention.

Referring to FIG. 3, a flow chart showing one embodiment of a method for summarizing and presenting the present invention is illustrated. In step 50, a user or operator of the client processing system conducts an Internet search. To conduct a search, an operator inputs a URL for a search engine with the user input device 19. The client processing system 17 transmits the URL for the search engine to the search server 15 which retrieves the requested search engine.

Next, the operator is prompted on the display device 21 to enter a search request 30 into the retrieved search engine. The operator inputs the search expression or parameters of the search request 30 for the search engine using the user input device 19. The search request is transmitted to the search server 15 where the search engine performs the search using the search request 30.

Next, search results 32, in this particular example URLs and other search information, responsive to the search request 30 are retrieved. The retrieved search results 32 are transmitted from the search server 15 back to the client processing system 17 where the search results 32 are displayed on the display device 21 for the operator in step 52. Unfortunately, in this display format, the search results 32 are not in an easily readable or understandable format.

Although one example of an Internet search is discussed above, any compilation and listing of websites in response to a query by any search engine, such as Yahoo® or AskOnce® (by Xerox®), may be utilized by the present invention. Additionally, any common web browser or client processing system 17 and any Internet search engine/agent can be used to perform the Internet search.

Referring back to FIG. 3, in step 54 the search server 15 identifies the URLs in the contents of the search result 32. Next, in step 56 the search server 15 prioritizes the identified URLs into an order for extraction. The prioritization is typically a function of the Internet search engine/agent used by the search server 15, although other parameters may be used to prioritize the URLs as required by or desired for the particular application.

Once the URLs are prioritized, in step 58 the search server 15 extracts a URL. Typically, the search server 15 extracts the URL with the highest priority first, although any order for extracting the URLs can be used.

Next, in step 60 the search server 15 fetches and accesses the contents of the extracted URL. Typically, the fetched and accessed contents are HTML documents or items.

Next, in step 62 the search server 15 summarizes the fetched and accessed contents. In this particular embodiment, the search server 15 generates a text summary of the fetched and accessed contents which is then converted to a page description language, such as Adobe PostScript® or another PDL, to provide a page description language summary, although other summarization procedures can be used. By way of example, the search server 15 might use the InXsight® Software Summarizer produced by Xerox® product or the method and system for summarizing disclosed in U.S. Pat. No. 5,918,240 which is herein incorporated by reference for accomplishing the text summary of the contents. The search server 15 can be configured to summarize the contents to whatever format is required or desired for the particular application for the layout being provided, such as summarizing the fetched and accessed contents to no more than ten lines of English ASCII text.

Next, in step 66 the page description language summary for the extracted, fetched and accessed URL is stored in a memory storage device in search server 15, although other memory devices or repository can be used to store the summaries. In this particular embodiment, each summary is checked into a Xerox® DigiFlow® Automated Fulfillment (DFAF) document repository by way of a DFAF software application executed by search server 15, although other memory devices and procedures can be used. The DFAF software application is a commercially available software product.

Meanwhile, in step 68 a layout of the page description language summary for presentation is generated by search server 15. In this particular embodiment, search server 15 uses a software application, such as the Xerox® DigiFlow® Automated Fulfillment, to construct the layout for presentation. As the layout is being generated for the accessed contents from each fetched URL, the layout is stored in memory in search server 15. In this particular embodiment the layout is stored in the repository in search server 15, although the layout could be stored elsewhere. A variety of different layouts of the summaries can be used.

Next, in step 70 a determination is made by the search server 15 on whether or not all of the identified URLs have been fetched. If this is not the last URL to be fetched, the No branch is taken from step 70 back to step 60 where the next URL based on the prioritization is fetched and steps 60, 62, 64, 66, 68, and 70 are repeated as described above.

If this is the last URL to be fetched, then the Yes branch is taken from step 70 to step 72. In step 72, once every URL has been fetched and the associated contents accessed, summarized, and laid out, then the search server 15 provides the layout of the PDL summaries which has been generated for presentation.

Next, in step 74 a selection of the output format is made in search server 15. The operator at client processing system 17 can input a desired output format by way of keyboard 19 and transmit the request to the search server 15.

If a hard copy format for the provided layout is selected in step 74, then in step 76 search server 15 transmits the layout of the summaries to a printer that prints out a hard copy document of the layout. In step 78, the hard copy document of the summaries can be mailed back or otherwise delivered to the operator.

If an electronic document format for the provided layout is selected in step 74, then in step 80 search server 15 generates the electronic document in the appropriate format, such as an Adobe® PDF document, or Palm® based electronic document, and transmits the electronic document to the client processing system 17, such as by way of e-mail, WAP enabled cell phone or even a simple text pager. The electronic document for the provided layout is then displayed on the display device 21 for the operator when the electronic document is opened.

Figure 4:
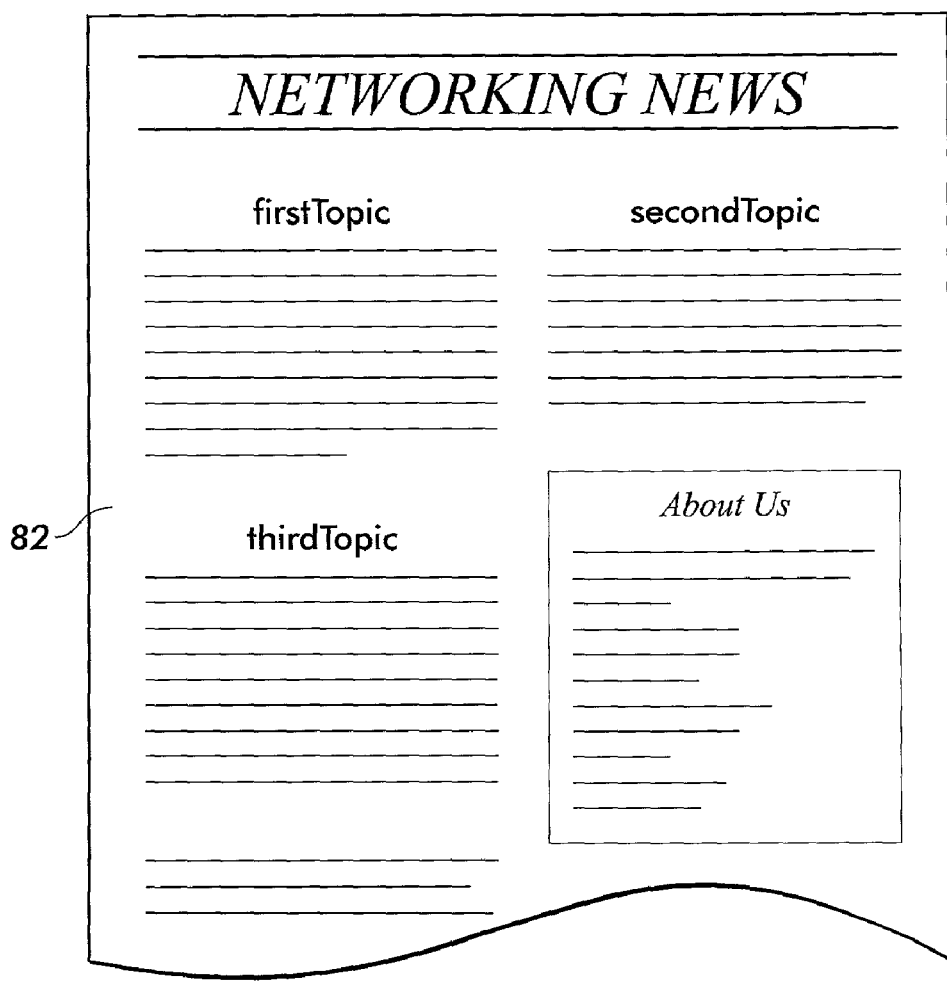
FIG. 4 is an example of text summaries of a typical listing provided by an agent/search engine.

By way of example only, a provided layout 82 of summaries of URLs from an Internet search is illustrated in FIG. 4. The URLs which are summarized in this layout 82 are listed above it. As illustrated in this example, the generated layout provides an easily readable and understandable format of the results of the Internet search for the operator. As a result, the operator can quickly peruse through the different summaries to identify the web sites of particular interest making the searching process much more efficient.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A method for summarizing and presenting information from contents of an Internet search, the method comprising:
   extracting one or more uniform resource locators from the contents of the Internet search;
   fetching each of the extracted uniform resource locators to access one or more HTML items associated with each of the fetched uniform resource locators;
   generating a text summary of the accessed HTML items for each of the uniform resource locators;
   converting each of the text summaries to a page description language summary, wherein the page description language summary provides a summary of the layout and content of the text summary as described in a page description language;
   generating a layout of at least two of the page description language summaries; and
   providing the layout of the summaries for the contents of the Internet search.

2. The method as set forth in claim 1 further comprising:
   prioritizing the extracted uniform resource locators before the fetching; and
   determining an order for the fetching based on the prioritizing.

3. The method as set forth in claim 1 further comprising delaying the providing of the layout until all of the extracted uniform resource locators from the contents of the Internet search have been fetched.

4. The method as set forth in claim 1 further comprising storing each of the summaries.

5. The method as set forth in claim 1 wherein providing the layout further comprises providing an electronic document with the layout of the summaries for the contents of the Internet search.

6. The method as set forth in claim 1 wherein the providing the layout further comprises providing a hard copy document with the layout of the summaries for the contents of the Internet search.

7. The method as set forth in claim 1 further comprising selecting the layout of the at least two of the page description language summaries, wherein the layout processing system generates the layout based on the selected layout.

8. The method as set forth in claim 1 wherein the generating generates a non-graphic, text summary of the accessed HTML items for each of the uniform resource locators.

9. A system for summarizing and presenting information from contents of an Internet search, the system comprising:
   an extraction processing system that extracts one or more uniform resource locators from the contents of the Internet search;
   a fetching system that fetches each of the extracted uniform resource locators to access one or more HTML items associated with each of the fetched uniform resource locator;
   a summary processing system that generates a text summary of the accessed HTML items for each of the uniform resource locators;
   a converting system that converts each of the text summaries to a page description language summary, wherein the page description language summary provides a summary of the layout and content of the text summary as described in a page description language;
   a layout processing system that generates layout of at least two of the page description language summaries; and
   a presentation processing system that provides the layout of the summaries of the contents of the Internet search.

10. The system as set forth in claim 9 further comprising:
    a prioritizing system that prioritizes the extracted uniform resource locators before the fetching; and
    an ordering system that determines an order for the fetching based on the prioritizing.

11. The system as set forth in claim 9 further comprising a delay processing system that delays the presentation processing system from providing of the layout until all of the extracted uniform resource locators from the contents of the Internet search have been fetched.

12. The system as set forth in claim 9 further comprising a memory device for storing each of the summaries.

13. The system as set forth in claim 9 wherein the presentation processing system provides an electronic document with the layout of the summaries for the contents of the Internet search.

14. The system as set forth in claim 9 wherein the presentation processing system provides a hard copy document with the layout of the summaries for the contents of the Internet search.

15. The system as set forth in claim 9 further comprising a selection system that selects the layout of the at least two of the page description language summaries, wherein the generating generates the layout based on the selected layout.

16. The system as set forth in claim 9 wherein the summary processing system generates a non-graphic, text summary of the accessed HTML items for each of the uniform resource locators.

17. A computer readable medium having stored thereon instructions for summarizing and presenting information from contents of an Internet search which when executed by a processor, cause the processor to perform the steps of:
   extracting one or more uniform resource locators from the contents of the Internet search;
   fetching each of the extracted uniform resource locators to access one or more HTML items associated with each of the fetched uniform resource locator;
   generating a text summary of the accessed HTML items for each of the uniform resource locators;
   converting each of the text summaries to a page description language summary, wherein the page description language summary provides a summary of the layout and content of the text summary as described in a page description language;
   generating a layout of at least two of the page description language summaries; and
   providing the layout of the summaries for the contents of the Internet search.

18. The medium as set forth in claim 17 further comprising:
   prioritizing the extracted uniform resource locators before the fetching; and
   determining an order for the fetching based on the prioritizing.

19. The medium as set forth in claim 17 further comprising delaying the providing of the layout until all of the extracted uniform resource locators from the contents of the Internet search have been fetched.

20. The medium as set forth in claim 17 further comprising storing each of the summaries.

21. The medium as set forth in claim 17 wherein providing the layout further comprises providing an electronic document with the layout of the summaries for the contents of the Internet search.

22. The medium as set forth in claim 17 wherein the providing the layout further comprises providing a hard copy document with the layout of the summaries for the contents of the Internet search.

23. The medium as set forth in claim 17 further comprising selecting the layout of the at least two of the page description language summaries, wherein the generating generates the layout based on the selected layout.

24. The medium as set forth in claim 17 wherein the generating generates a non-graphic, text summary of the accessed HTML items for each of the uniform resource locators.

* * * * *